United States Patent
Chapel

(10) Patent No.: US 7,539,012 B2
(45) Date of Patent: May 26, 2009

(54) DATA STORAGE MEDIUM READ/WRITE UNIT COMPRISING A HEAT SINK

(75) Inventor: Claude Chapel, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 284 days.

(21) Appl. No.: 10/554,335

(22) PCT Filed: Apr. 21, 2004

(86) PCT No.: PCT/EP2004/004275

§ 371 (c)(1),
(2), (4) Date: Oct. 24, 2005

(87) PCT Pub. No.: WO2004/097834

PCT Pub. Date: Nov. 11, 2004

(65) Prior Publication Data

US 2006/0198099 A1   Sep. 7, 2006

(30) Foreign Application Priority Data

Apr. 30, 2003 (FR) .................. 03 05287
Apr. 30, 2003 (FR) .................. 03 05288
Apr. 30, 2003 (FR) .................. 03 05316

(51) Int. Cl.
*G06F 1/20* (2006.01)
(52) U.S. Cl. ................................ 361/687
(58) Field of Classification Search ............ 361/687, 361/685
See application file for complete search history.

(56) References Cited

U.S. PATENT DOCUMENTS

| 4,642,715 | A | * | 2/1987 | Ende | 360/97.02 |
| 5,510,954 | A | | 4/1996 | Wyler | |
| 5,546,250 | A | | 8/1996 | Diel | |
| 5,703,734 | A | | 12/1997 | Berberich et al. | |
| 5,828,546 | A | * | 10/1998 | Tirrell et al. | 361/685 |
| 6,005,768 | A | | 12/1999 | Jo | |
| 6,069,792 | A | | 5/2000 | Nelik | |
| 6,141,211 | A | * | 10/2000 | Strickler et al. | 361/685 |
| 6,243,228 | B1 | | 6/2001 | Yoshida et al. | |
| 6,373,696 | B1 | | 4/2002 | Bolognia et al. | |
| 6,377,455 | B1 | * | 4/2002 | Nelik | 361/687 |
| 6,442,021 | B1 | * | 8/2002 | Bolognia et al. | 361/685 |
| 6,819,555 | B2 | * | 11/2004 | Bolognia et al. | 361/685 |

(Continued)

FOREIGN PATENT DOCUMENTS

DE    19833050    1/2000

(Continued)

OTHER PUBLICATIONS

Search Report dated Sep. 1, 2004.

*Primary Examiner*—Lisa Lea-Edmonds
(74) *Attorney, Agent, or Firm*—Robert D. Shedd; Harvey D. Fried; Patricia Verlangieri

(57) ABSTRACT

A data storage medium read/write unit, designed to be installed in an electronic apparatus, comprising an electronic read/write device or electronic module and a plastic thermal non conducting housing definitively bound to the electronic read/write device. The housing holds at least one embedded metallic heat sink that is closely in contact with the lateral sides of the electronic read/write device for cooling it. Application to MPEG-2 and H.264 encoding.

9 Claims, 2 Drawing Sheets

U.S. PATENT DOCUMENTS

| | | | |
|---|---|---|---|
| 6,867,963 B2 * | 3/2005 | Staiano | 361/685 |
| 7,068,506 B2 * | 6/2006 | Behl | 361/695 |
| 2002/0030921 A1 | 3/2002 | Hashizume et al. | |
| 2002/0126450 A1 | 9/2002 | Cheng | |
| 2002/0154474 A1 | 10/2002 | Merz et al. | |
| 2003/0193778 A1 * | 10/2003 | Staiano | 361/687 |

FOREIGN PATENT DOCUMENTS

| | | |
|---|---|---|
| EP | 0915468 | 5/1999 |
| WO | WO 02/063628 | 8/2002 |

* cited by examiner

DATA STORAGE MEDIUM READ/WRITE UNIT COMPRISING A HEAT SINK

The invention relates to a data storage medium read/write unit comprising a heat sink.

Data storage medium read/write units such as disk drives are used in electronic equipment to read data from (and also in general to record data onto) a storage medium, such as an optical medium (optical disk), a magnetic medium (hard disk or magnetic tape or others: for example, magnetooptic or semiconductor storage device).

These read/write units are not exclusively used in electronic equipment for information technology; they are also employed in consumer electronic products or other audio and/or video products (professional video, for example).

It has already been proposed that these read/write units, and in particular hard-disk drives, be removable from the equipment designed to receive them. In addition to allowing the medium to be interchangeable between two or more systems, this solution allows the read/write unit and/or its medium to be changed without having to change the whole system, and thus allows advantage to be taken, at a lower cost, of the latest advances in technology as regards read/write units and/or data storage media, accompanied in general by an increase in the storage capacity.

In order to prevent too large a temperature rise in the read/write unit adversely affecting its operation, the use of a heat sink has already been proposed, as in the Patent Application WO 02/063628 for example.

The subject of the present invention is a solution for mounting the heat sink in the read/write unit that best reconciles the various design constraints, especially as regards cooling efficiency, size and cost (for example, material cost and manufacturing cost of the drive).

The invention thus proposes a data storage medium read/write unit, designed to be installed in an electronic apparatus, comprising an electronic read/write device (or electronic module) and a non-conducting housing attached to the electronic read/write device, in which the housing holds at least one heat sink in direct contact with the electronic read/write device for cooling it.

According to preferred embodiments:

- the housing has means for mounting within the electronic apparatus;
- the mounting means and the heat sink are received on two separate faces of the housing;
- the mounting means are received on a lower or upper face of the housing and the heat sink is received on one side face of the housing;
- the housing has at least one protruding part forming at least one reinforcement and the heat sink is received in the reinforcement;
- the protruding part is a protection made of flexible material;
- the heat sink is in contact with one side of the electronic read/write device;
- a thermal conductor is placed between the heat sink and the electronic read/write device;
- the housing is made from a plastic and the housing is overmoulded onto the heat sink;
- the housing comprises at least one protection made of mechanically absorbing material;
- the electronic read/write device is mounted within the housing in a permanent fashion;
- the electronic read/write device is a disk drive.

Further features and advantages of the invention will become apparent in the light of the following detailed description which makes reference to the appended figures, in which.

Figure 1:
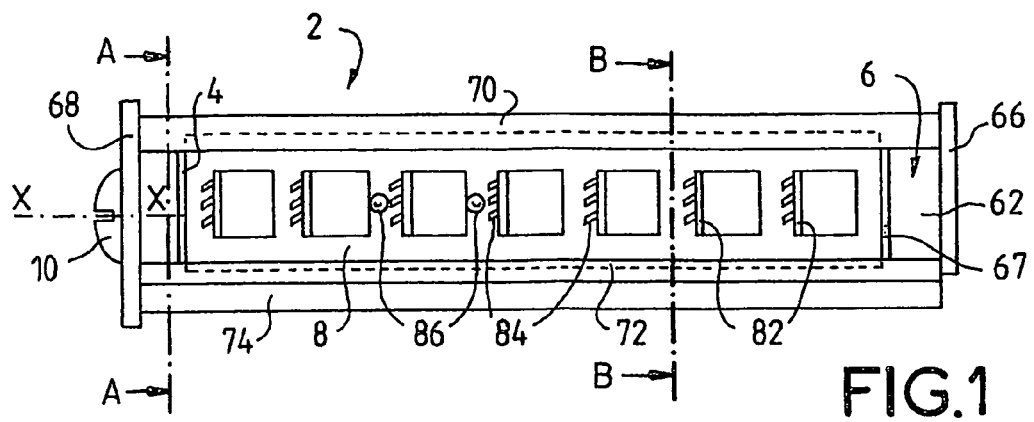
FIG. 1 is a side view of a hard-disk drive constructed according to the proposal of the invention.

The hard-disk drive 2 shown in the figures comprises an electronic module 4, which constitutes the active part of the read/write drive from an electrical or electronic standpoint, and a housing 6 that encloses the electronic module 4 and retains it in a permanent fashion.

The hard-disk drive 2 is designed to be installed in a removable fashion in an electronic apparatus, such as in a personal computer or audio and/or video player/recorder.

The electronic module 4 is basically parallelepipedal in shape with metal walls, for example made of aluminium. The electronic module 4 comprises a hard disk, means for reading from and writing to the hard disk, hard-disk interfacing means and connectors, for example a power supply connector 44 and a signal connector 42 for transmitting the data to be exchanged with the electronic apparatus.

The housing 6, for example made from a plastic, comprises a shell 62 whose transverse cross section is basically a U-shape and which receives the electronic module 4. The shell 62 is closed by a separate panel or cover 64 which allows the electronic module 4 to be immobilized in the transverse direction within the housing 6. The cover 64 is attached in a permanent fashion to the shell 62, for example by welding or bonding.

Figure 4:
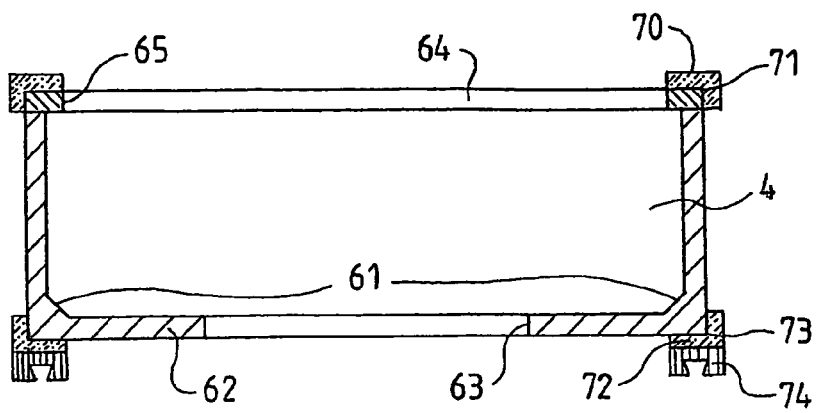
FIG. 4 is a cross-sectional view along line A-A of the drive in FIG. 1.

The housing 6 also comprises a rear panel 66 mounted in a permanent fashion onto the shell 62 and the cover 64. The rear panel 66 allows the electronic module 4 to be held axially in a first direction (backwards). The presence of spigots 61 in the front part of the shell 62 (as are clearly visible in FIG. 4) allows the electronic module 4 to be held axially in a second direction opposing the first direction (forwards).

The rear panel 66 comprises an opening 46 allowing the passage of connectors from the electronic apparatus that plug into the power supply connector 44 and signal connector 42 when the disk drive 2 is installed in the electronic apparatus.

A front cover or front panel 68 closes up the housing 6 in its front part opposite to its rear part receiving the rear panel 66. The front panel 68 has a button 10 controlling a device for retaining the hard-disk drive 2 in the electronic apparatus. This retention device is, for example, a bar 12 parallel to the front panel 68 and mounted so as to rotate together with the button 10 about an axis X-X perpendicular to the front panel 68 (and therefore essentially parallel to the aforementioned axial direction of the drive). The front panel 68 could also be fitted with a means facilitating manual removal of the disk drive 2, such as a handle.

Figure 3:
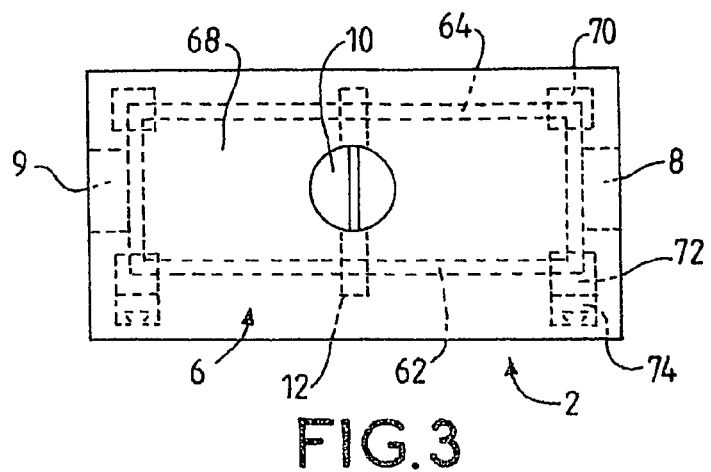
FIG. 3 is a front view of the drive in FIG. 1.

When the hard-disk drive 2 is installed in the electronic apparatus and the bar 12 is aligned in a vertical direction (as shown in FIG. 3), the bar is in contact with means of retention in the electronic apparatus that stop the hard-disk drive 2 being removed from the electronic apparatus.

Rotating the button 10 and, consequently, the bar 12 away from the vertical position (shown in FIG. 3) allows the bar to be freed from the means of retention in the electronic apparatus and therefore the disk drive 2 to be removed from the electronic apparatus (for example, by pulling on a handle firmly fixed to the front panel 68).

If required, the bar 12 can be made to activate a safe-locking detector in the electronic apparatus when it is in the locked position (removal not possible). The information thus detected can be exploited by the electronic apparatus as an indicator of the effective presence of the disk drive 2 in the electronic apparatus.

Figure 2:
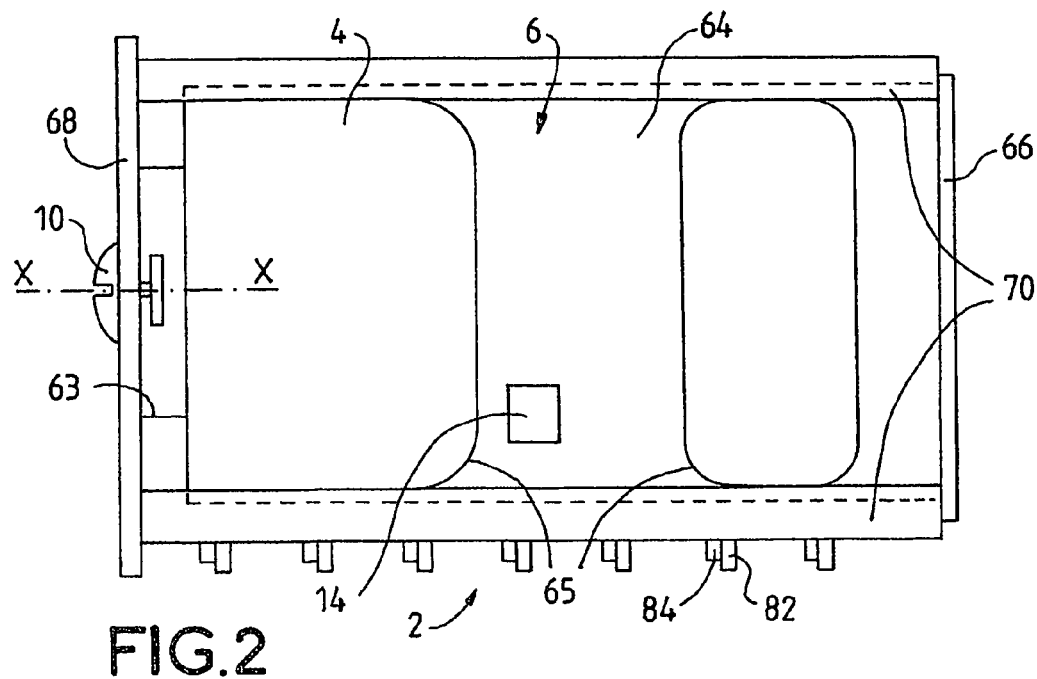
FIG. 2 is a top view of the drive in FIG. 1.

In order, in particular, to allow the bar 12 to pass when it is rotated, the shell 62 and the cover 64 each have at least one opening 63, 65. More precisely, as is clearly visible in FIGS. 2 and 4, the shell 62 has one opening 63 and the cover 64 has two openings 65 which, in addition to the movement of the bar 12, allow, on the one hand, access to information possibly written on the electronic module 4 and, on the other, the heat generated by the electronic module 4 to be removed more efficiently.

In order to further improve heat removal, the hard-disk drive 2 comprises two heat sinks 8, 9, for example made of blackened steel plate or aluminium, each placed on a side face of the hard-disk drive 2 in a recess 67 of the corresponding side wall of the shell 62.

Figure 5:
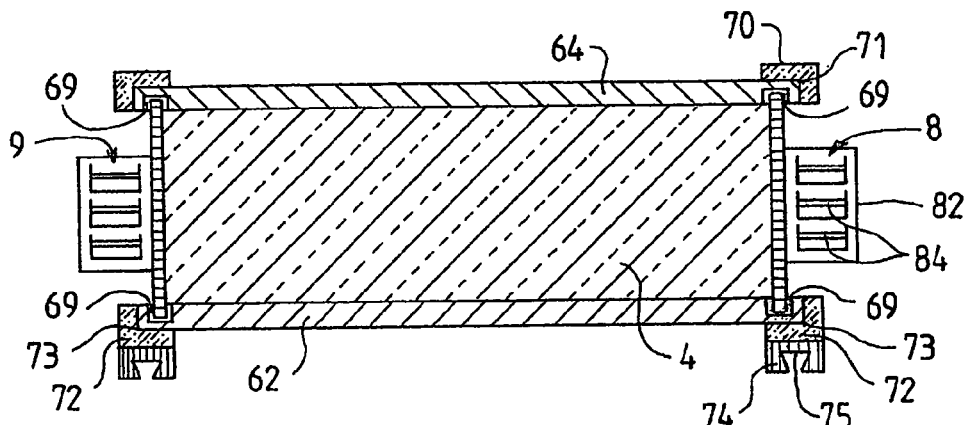
FIG. 5 is a cross-sectional view along line B-B of the drive in FIG. 1.
Figure 6:
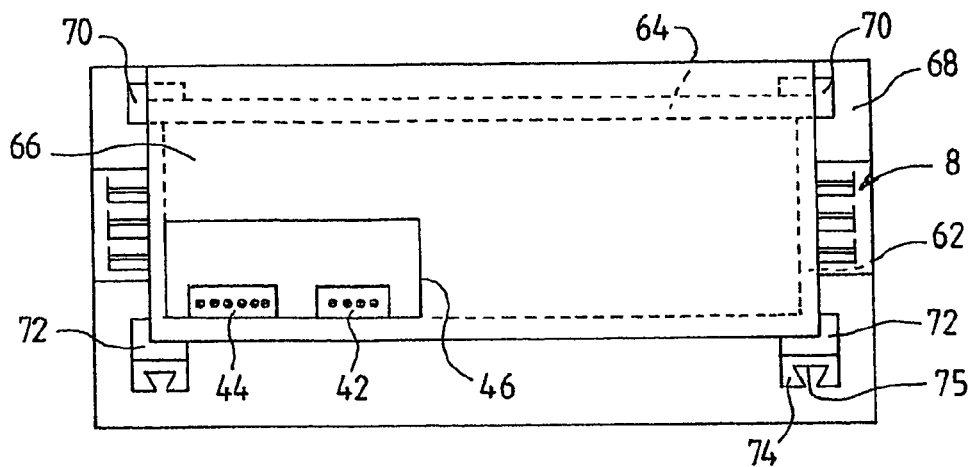
FIG. 6 is a rear view of the drive in FIG. 1.

As can be clearly seen in FIG. 5, each of the heat sinks 8, 9 is mounted in the housing 6 by means of notches 69 formed on the interior surface of the housing panels 62, 64 (that is, on the lower face of the cover 64 and on the upper face of the shell base 62). The heat sinks 8, 9 are thus essentially supported by the housing 6 and therefore, from a mechanical standpoint, form an integral part of the latter. As a variant, instead of a mechanical mounting of the heat sinks onto the housing (here by means of notches 69), certain notches sides could be overmoulded onto the heat sinks 8, 9 or a combination of these two solutions could be used.

Each heat sink 8, 9 comprises a base that is therefore parallel to a side face of the electronic module 4 and a plurality of cooling fins 82 formed by cutting and bending the metal plate. Each cooling fin 82 thus extends in a transverse plane, more or less parallel to the front panel 68. Each cooling fin 82 comprises a plurality of smaller projections 84 made by cutting and bending the metal plate.

The base of each of the heat sinks 8, 9 is brought into contact with the side face of the electronic module 4, for example using a screw 86. According to a variant that may be envisaged, a material having a good thermal conductivity, such as for example silicone grease, may be interposed between the heat sink 8, 9 and the side face of the electronic module 4.

The housing 6 also comprises, on a part of its exterior surface, protections made of a mechanically absorbing material which is ideally able to cushion mechanical shocks and dampen vibrations, such as an elastomer for example. More precisely, the housing 6 comprises two upper protections 70 and two lower protections 72.

Each upper protection 70 is firmly attached to the cover 64 and respectively covers the corner 71 formed by the intersection of the upper face of the cover 64 and one of the side faces of the cover 64. When the housing 6 is assembled, each protection 70 therefore covers a corner 71 formed by the intersection of the cover 64 and of a side face of the shell 62.

Each lower protection 72 is firmly attached to the shell 62 and respectively covers the corner 73 formed by the intersection of the lower face and one of the side faces of the shell 62.

The upper protections 70 and the lower protections 72 are, for example, produced by overmoulding onto the cover 64 and the shell 62, respectively.

Two sliding guides 74 are each received on the lower face of the lower protections 72 and are therefore mounted onto the lower face of the shell 62 by means of the lower protec tions 72. Each guide 74 has a uniform cross section 75 (trapezoidal for example) that is complementary to the cross section of corresponding rails of the electronic apparatus. The guides 74 thus facilitate the installation of the disk drive 2 into the electronic apparatus.

The protections 72, 74 thus not only allow any possible shocks experienced by the disk drive 2 during handling to be cushioned, but also significantly limit the transmission of vibrations between the electronic apparatus and the disk drive 2.

As a variant, the electronic apparatus could have contact areas that are designed to come into contact with the protections 70, 72 in order to further improve the mechanical retention of the disk drive 2. These points of contact would not however lead to the transmission of vibrations since they are formed at the protections 70, 72 by a mechanically absorbing material.

Furthermore, the mounting system proposed does not use all the longitudinal faces (side, upper and lower) of the disk drive 2 (here, only the lower face is used by the guides 74) and therefore allows at least one face (here the two side faces) to be used for mounting a heat sink (here two heat sinks 8, 9). By virtue of the use of a large and open surface area for mounting heat sinks 8, 9, the heat removal is effected in especially advantageous conditions.

In the proposed construction, reinforcements are additionally used which are placed between the upper protections 70 and the lower protections 72 by the cut-outs 67 accommodating the heat sinks 8, 9. The use of the volume of the disk drive 2 is therefore optimized.

The housing 6 has a shock indicator 14 which allows the violence of the shocks experienced by the disk drive 2 to be measured, and which thus serves as a reference in the case of litigation between any of the various parties in possession of the disk drive 2, for example between the manufacturer and the end user.

It should also be noted that access to the interior of the electronic module 4 is impossible without destroying at least part of the housing 6 whose sides are assembled in a permanent fashion. Any attempt to open the electronic module 4 or to use it in a manner other than that intended by the manufacturer will therefore be very easily detectable.

The invention is not, of course, limited to the example embodiment described hereinabove.

The invention claimed is:

1. Data storage medium read/write unit, designed to be installed in an electronic apparatus, comprising:
   an electronic read/write device;
   a plastic thermal non-conducting housing definitively bound to the electronic read/write device, so that opening of the housing destroy said housing, the housing sides being assembled in a permanent fashion;
   wherein the housing holds at least one embedded metallic heat sink that is closely in contact with the lateral sides of the electronic read/write device for cooling it.

2. Read/write unit according to claim 1, in which the housing has means for mounting within the electronic apparatus.

3. Read/write unit according to claim 2, in which the mounting means and the heat sink are received on two separate faces of the housing.

4. Read/write unit according to claim 2, in which the mounting means are received on a lower or upper face of the housing and in which the heat sink is received on one side face of the housing.

5. Read/write unit according to claim 1, in which the housing has at least one protruding part forming at least one reinforcement and in which the heat sink is received in the reinforcement.

6. Read/write unit according to claim 5, in which the protruding part is a protection made of flexible material.

7. Read/write unit according to claim 1, in which a thermal conductor is placed between the heat sink and the electronic read/write device.

8. Read/write unit according to claim 1, in which the housing is over molded onto the heat sink.

9. Read/write unit according to claim 1, in which the electronic read/write device is a disk drive.

* * * * *